J. T. HALL.
TRUNK STRAP.
APPLICATION FILED JULY 30, 1915.
1,177,321.
Patented Mar. 28, 1916.
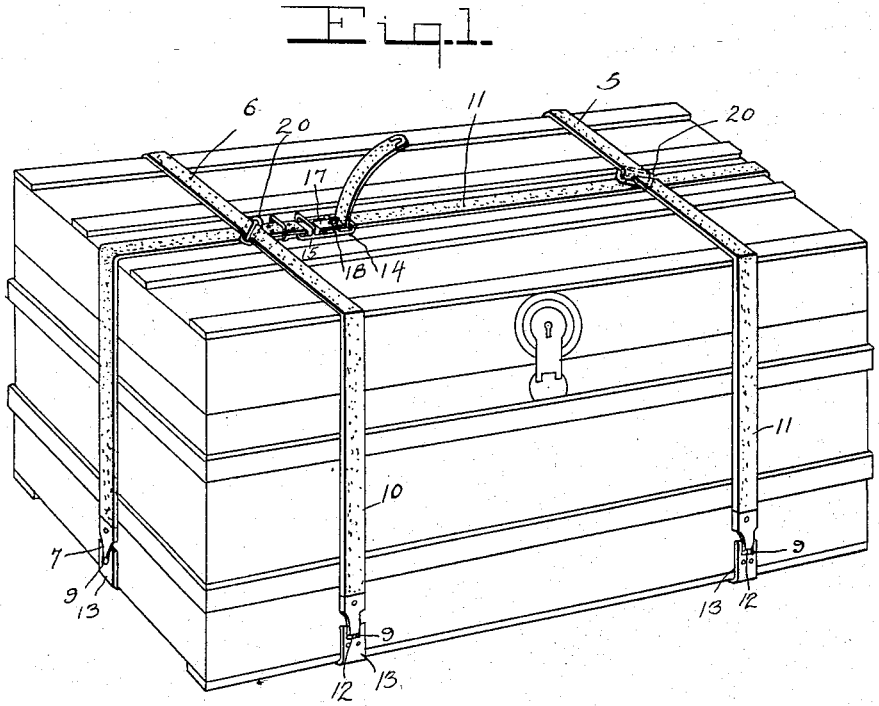
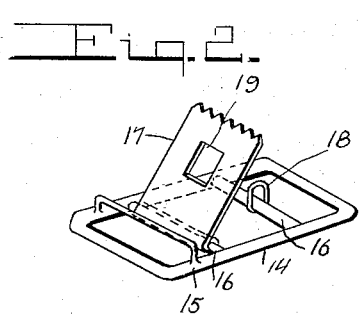
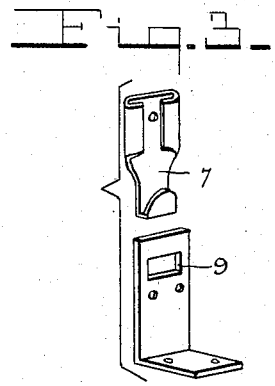
Inventor
J. T. Hall

UNITED STATES PATENT OFFICE.

JAMES T. HALL, OF WACO, TEXAS.

TRUNK-STRAP.

1,177,321.  Specification of Letters Patent.  Patented Mar. 28, 1916.

Application filed July 30, 1915. Serial No. 42,773.

*To all whom it may concern:*

Be it known that I, JAMES T. HALL, a citizen of the United States, residing at Waco, in the county of McLennan and State of Texas, have invented certain new and useful Improvements in Trunk-Straps; and I do hereby declare the following to be a full, clear, and exact description of the invention, such as will enable others skilled in the art to which it appertains to make and use the same.

This invention relates to trunk straps and has for its primary object to provide an efficient and inexpensive trunk strap composed of a plurality of sections, and means for detachably securing the ends of the sections to the trunk.

Another object is the provision of a trunk strap composed of a plurality of sections, one of the sections being formed in two parts and provided with a lock controlled buckle or other similar adjusting means, whereby the sections of the strap may be drawn tightly over the hinged or removable top of the trunk.

With these and other objects in view, the invention consists in the novel construction, combination and arrangement of parts as will be hereinafter specifically described, claimed and illustrated in the accompanying drawing, in which:

Figure 1 represents a perspective view of a trunk, illustrating the improved straps applied to use thereon. Fig. 2 represents a perspective view of the buckle removed. Fig. 3 represents a perspective view of one of the hooks and securing members therefor removed from the trunk.

Referring to the drawing in detail, wherein similar reference numerals designate corresponding parts throughout the several views, the numerals 5 and 6 indicate a pair of non-extensible or non-adjustable sections constituting parts of the trunk strap, each of which is provided at its opposite ends with hook members 7 having inwardly directed beaks. Each strap is also bent centrally on a diagonal line and the end portions thereof are extended at right angles along the top or cover of the trunk and downwardly along the rear and end walls thereof. Angular plates are secured to the lower portions of the rear and end walls and bottom of the trunk and the upper angular ends thereof are formed with slots 9 in which are removably engaged the beaks of the hook members 7.

The third section of the trunk strap is formed in two parts, designated respectively by the numerals 10 and 11. The ends of the parts 10 and 11 are extended in alinement between the bight portions of the sections 5 and 6, and the opposite ends of said parts are extended at right angles along the front, top or cover and downwardly along the front wall thereof, and are provided at their extreme ends with hook members 12 similar to the members 7. The hook members 12 are removably engaged in slots formed in angular plates 13 secured to the lower portion of the front walls of the trunk and the bottom of the latter.

A buckle, designated generally by the numeral 14, and illustrated in detail in Fig. 2, is secured to one of the terminals of one of the parts of the third section comprising the trunk strap. The buckle 14 comprises a rectangular frame 15 in which are rigidly secured a pair of cross bars 16 to one of which is pivotally secured a tongue having a series of teeth along its free edge adapted to engage the adjacent extremity of part 11. A hasp 18 is secured to the other cross bar 16 adjacent the free end of the tongue 17 and the latter is provided with a slot 19 for the reception of the hasp, whereby, subsequent to the adjustment of the parts 10 and 11 of the strap section, a pad lock or other type of lock may be applied to the hasp 18 to lock the tongue 17 in adjusted position. Elongated loops 20 are provided for connecting the bight portions of the strap section 5 and the part 11 and the strap section 6 and the part 10.

In use, the several sections comprising the strap are assembled upon a trunk in the manner illustrated in Fig. 1, and the free end of the part 11 is engaged to the tongue 17 of the buckle and is drawn tightly so as to secure the several sections upon the trunk. Pressure is subsequently applied to the tongue 17 so as to embed the teeth of the latter in the adjacent end of the part 11. If desired, the lock may be applied to the hasp 18 so as to insure against the tongue 17 becoming accidentally disengaged from the part 11.

What I claim is:

1. A trunk strap including three strap sections, one of said sections being formed in two parts, an adjustable connection between the parts of said sections, and means for detachably securing the ends of the sections to a trunk 2. A trunk strap including a plurality of strap sections, one of said sections being formed in two parts, an adjustable connection between said parts, hook members secured to the free ends of said strap sections, and means for detachably securing said hooks to a trunk.

3. A trunk strap including a plurality of sections, one of said sections being formed in two parts, elongated loops connecting said sections, and an adjustable connection between the parts of the two-part section.

4. A trunk strap including a plurality of sections, one of said sections being formed in two parts, an adjustable connection between said parts, means for locking said connection in adjusted position, and elongated loops connecting said sections.

5. In combination, a trunk, a plurality of angular members secured to said trunk and having elongated slots therein, a strap including a plurality of sections, one of said sections being formed in two parts, an adjustable connection between the parts of said section, and hook members carried by the free ends of said sections adapted to engage in said slots.

In testimony whereof I affix my signature in presence of two witnesses.

JAMES T. HALL.

Witnesses:
 GEO. S. McGHEE,
 JNO. H. BARRON.

Copies of this patent may be obtained for five cents each, by addressing the "Commissioner of Patents, Washington, D. C."